United States Patent
Iuchi et al.

(10) Patent No.: US 11,066,569 B2
(45) Date of Patent: Jul. 20, 2021

(54) PAINT COMPOSITION FOR TOPCOATS HAVING AN ACRYLIC RESIN AND A MELAMINE RESIN AS THE MAIN RESINS

(71) Applicant: BASF Coatings GmbH, Münster (DE)

(72) Inventors: Makoto Iuchi, Yokohama (JP); Tetsu Konishi, Yokohama (JP); Daisuke Fujiki, Yokohama (JP)

(73) Assignee: BASF Coatings GmbH, Münster (DE)

( * ) Notice: Subject to any disclaimer, the term of this patent is extended or adjusted under 35 U.S.C. 154(b) by 113 days.

(21) Appl. No.: 16/464,770

(22) PCT Filed: Nov. 10, 2017

(86) PCT No.: PCT/EP2017/078935
§ 371 (c)(1),
(2) Date: May 29, 2019

(87) PCT Pub. No.: WO2018/099711
PCT Pub. Date: Jun. 7, 2018

(65) Prior Publication Data
US 2019/0309182 A1    Oct. 10, 2019

(30) Foreign Application Priority Data

Nov. 29, 2016   (JP) .............................. JP2016-230904

(51) Int. Cl.
| | |
|---|---|
| C09D 133/06 | (2006.01) |
| C08F 212/08 | (2006.01) |
| C08F 220/28 | (2006.01) |
| C08G 18/80 | (2006.01) |
| C09D 161/28 | (2006.01) |
| C08F 220/20 | (2006.01) |
| C09D 4/00 | (2006.01) |

(52) U.S. Cl.
CPC ........ C09D 133/066 (2013.01); C08F 212/08 (2013.01); C08F 220/20 (2013.01); C08F 220/28 (2013.01); C08G 18/80 (2013.01); C09D 4/00 (2013.01); C09D 161/28 (2013.01); *C08F 220/281* (2020.02)

(58) Field of Classification Search
CPC .... C08F 212/08; C08F 220/28; C08F 220/20; C08F 220/281; C09D 133/066; C09D 161/28; C09D 4/00; C08G 18/80
See application file for complete search history.

(56) References Cited

U.S. PATENT DOCUMENTS

| | | | |
|---|---|---|---|
| 5,346,958 A | 9/1994 | Yukawa et al. | |
| 5,374,682 A | 12/1994 | Gouda et al. | |
| 5,523,164 A | 6/1996 | Shibato et al. | |
| 5,977,256 A * | 11/1999 | Huybrechts | C08G 18/4063 524/507 |
| 2012/0077911 A1* | 3/2012 | Haraguchi | C09D 5/024 524/140 |
| 2012/0083021 A1* | 4/2012 | Bohling | C12Y 301/01003 435/135 |
| 2012/0083572 A1* | 4/2012 | Klots | C08F 212/08 524/576 |
| 2014/0378587 A1* | 12/2014 | Weiher | C09D 167/00 524/100 |

FOREIGN PATENT DOCUMENTS

| | | |
|---|---|---|
| JP | H05295322 A | 11/1993 |
| JP | H06142598 A | 5/1994 |
| JP | 2002080781 A | 3/2002 |
| JP | 2002167490 A | 6/2002 |

OTHER PUBLICATIONS

International Search Report and Written Opinion for International Patent Application No. PCT/EP2017/078935, dated Feb. 19, 2018, 8 pages.

* cited by examiner

*Primary Examiner* — Patrick D Niland
(74) *Attorney, Agent, or Firm* — Armstrong Teasdale LLP

(57) ABSTRACT

Described herein is a topcoat paint composition having an acrylic resin (A) and a melamine resin (B). The acrylic resin (A), relative to 100 parts by mass thereof, contains 30-40 parts by mass of 2-hydroxyethyl methacrylate, 10-30 parts by mass of styrene and 25 parts by mass or more of 2-ethylhexyl acrylate, and does not contain, relative to 100 parts by mass of the acrylic resin (A), more than 5 parts by mass of caprolactone compound(s) and/or hydroxy group-containing (meth)acrylates constituted of 7 or more carbons. The content of acrylic resin (A), relative to 100 parts by mass of total resin solids of the topcoat paint composition, is 45 parts by mass or more. The content of melamine resin (B), which does not contain complete alkyl ether type melamine resin, relative to the acrylic resin (A), as resin solids ratio, is acrylic resin (A)/melamine resin (B)=50/50 to 80/20.

7 Claims, No Drawings

PAINT COMPOSITION FOR TOPCOATS HAVING AN ACRYLIC RESIN AND A MELAMINE RESIN AS THE MAIN RESINS

CROSS-REFERENCE TO RELATED APPLICATIONS

This application is a U.S. National Phase Application of International Patent Application No. PCT/EP2017/078935, filed Nov. 10, 2017, which claims the benefit of priority to Japanese Patent Application No. 2016-230904, filed Nov. 29, 2016, the entire contents of which are hereby incorporated by reference herein.

TECHNOLOGICAL FIELD

The present invention relates to a paint composition for topcoats which is suitable for use as a topcoat paint which can be wet-on-wet applied onto a colored basecoat in various fields, in particular in the automobile paints field, and in particular it relates to a paint composition for topcoats which provides a paint film with excellent scratch resistance and acid rain resistance.

PRIOR ART

In general, methods for forming multilayer paint films wherein automobile bodies are the item being painted are performed by forming an electrocoated paint film on the item being painted and thermally curing, and then forming a multilayer paint film made up of a midcoat paint film, colored basecoat paint film and topcoat paint film. Here, various properties are demanded for the topcoat paint film, not only excellent paint film appearance, but also scratch resistance, acid rain resistance and the like.

As topcoat paint films with excellent scratch resistance and acid rain resistance, paint compositions with a hydroxyl-group-containing resin and a polyisocyanate resin as the main resins, and paint compositions having an epoxy-group-containing resin and an acid-group-containing resin as the main resins are common, but since the mutual reactivity of the resins is high in either of the paint compositions, either they are made as two-pack paints, or, if they are one-pack, there are limitations as to their service life and storage temperature conditions. On the other hand, with paint compositions for topcoat use having an acrylic resin and a melamine resin as the main resins, since there are few limitations to their service life and storage temperature conditions, even in one-pack form, they are at present widely used, and with such topcoat paint compositions also, excellent acid rain resistance and scratch resistance are desired.

As methods of improving the scratch resistance of topcoat paint compositions having an acrylic resin and a melamine resin as the main resins, methods (patent references 1 and 2) wherein a caprolactone compound and/or a hydroxy group-containing (meth)acrylate constituted of 7 or more carbons are incorporated into the acrylic resin are known, but if these methods are used, not only does the acid rain resistance decrease, but also, if glitter material components such as aluminum pigment are incorporated in the basecoat composition, there are problems in that the orientation of these pigments is decreased and the designability decreases.

Meanwhile, as a method of improving the acid rain resistance of topcoat paint compositions having an acrylic resin and a melamine resin as the main resins, a method (patent reference 3) wherein the glass transition temperature of the acrylic resin is increased is known, but if the glass transition temperature of the acrylic resin has been increased, the scratch resistance decreases. Apart from this, a method (patent reference 4) wherein a complete alkyl type melamine resin is used as the melamine resin is also known, but there are problems in that the molecular mass of the melamine resin becomes low, and if glitter material components such as aluminum pigment are incorporated into the basecoat paint composition, the orientation of these is decreased and the designability decreases. Thus, there were difficulties in improving all of the acid rain resistance, scratch resistance and designability in topcoat paints.

PRIOR ART REFERENCES

Patent References

[Patent reference 1] Unexamined Japanese Application 2002-167490
[Patent reference 2] Unexamined Japanese Application 2002-80781
[Patent reference 3] Unexamined Japanese Application Hei 6-142598
[Patent reference 4] Unexamined Japanese Application Hei 5-295322.

OUTLINE OF THE INVENTION

Problem to be Solved by Invention

Consequently, the purpose of the present invention was to provide a topcoat paint composition with which paint films can be obtained which exhibit excellent designability without low orientation by incorporation of glitter material components such as aluminum pigment contained in the colored basecoat paint composition, and which moreover exhibit excellent scratch resistance and acid rain resistance, even when wet-on-wet applied onto a colored basecoat.

Means of Solving the Problem

As a result of diligent and repeated research into the aforesaid problems, the present inventors discovered that the aforesaid problems can be solved by using an acrylic resin incorporating a specific quantity of a specific acrylic monomer and a melamine resin, and thus accomplished the present invention.

That is to say, the present invention relates to a topcoat paint composition which can be wet-on-wet applied onto a colored basecoat, and which has an acrylic resin (A) and a melamine resin (B) as the main resins. It is a topcoat paint composition wherein the acrylic resin (A), relative to 100 parts by mass of said acrylic resin, contains 30-40 parts by mass of 2-hydroxyethyl methacrylate, 10-30 parts by mass of styrene and 25 parts by mass or more of 2-ethylhexyl acrylate as monomer units, and does not contain, relative to 100 parts by mass of said acrylic resin (A), more than 5 parts by mass of other monomer units comprising caprolactone compound(s) and/or hydroxy group-containing (meth)acrylates constituted of 7 or more carbons, and an acrylic resin (A) of mass average molecular mass 5,000-12,000 and glass transition temperature (actual measured value) −25 to −5° C. is used, and, relative to 100 parts by mass of total resin solids of the topcoat paint composition, 45 parts by mass or more of acrylic resin (A) are incorporated, and the melamine resin (B) of the topcoat paint composition does not contain complete alkyl ether type melamine resin, and the content of said melamine resin (B), relative to the acrylic resin (A), as resin solids ratio, is acrylic resin (A)/melamine resin (B)=50/50 to 80/20.

Topcoat paint compositions are preferable wherein, as aforesaid melamine resins (B), those are used which contain, relative to 100 parts by mass of total melamine resin solids, 50 parts by mass or more of a melamine resin (B1) with a mass average molecular mass of 1,000-3,000.

Furthermore, those which, in 100 parts by mass of total topcoat paint composition resin solids, contain 15 parts by mass or less of a blocked isocyanate resin (C) are preferable.

Acrylic resins (A) not containing at least one of a caprolactone compound and a hydroxy group-containing (meth) acrylate containing 7 carbons or more, and preferably not containing either as monomer units, are preferable.

Effect of the Invention

Even in topcoat paint compositions applied wet-on-wet onto a colored basecoat, it is possible to obtain paint film with excellent scratch resistance, acid rain resistance, paint film appearance and weather resistance.

EMBODIMENTS OF THE INVENTION

Below, the present invention is explained in specific terms, however, the present invention is not limited to the specific examples.

As the main resins, the topcoat paint composition of the present invention contains an acrylic resin (A) and a melamine resin (B). The acrylic resins (A) used in the present invention can be obtained by known methods such as solution radical polymerization of ethylenically unsaturated monomers such as acrylic monomers.

As ethylenically unsaturated monomers for obtaining the acrylic resins (A), acrylic monomers containing hydroxy groups which react with melamine resins can be used. For example, one or more hydroxyl-group-containing acrylic monomers selected from esters of acrylic acid or methacrylic acid, specifically esters with hydroxyl-group-containing alkyl groups selected from the group comprising 2-hydroxyethyl, 2-hydroxypropyl, 2-hydroxy-1-methylethyl or 4-hydroxybutyl; caprolactone ring opening adducts of hydroxyalkyl acrylates or hydroxyalkyl methacrylates; ethylene oxide or propylene oxide adducts of hydroxyalkyl acrylates or hydroxyalkyl methacrylates can be selected and used.

However, in terms of acid rain resistance, paint film appearance and paint film hardness, hydroxyl-group-containing acrylic monomers with less than 7 carbons are preferable, and in particular 2-hydroxyethyl methacrylate, which is the 2-hydroxyethyl ester of methacrylic acid, is more preferable.

i) Caprolactone ring opening adducts (caprolactone compounds) of hydroxyalkyl acrylates or hydroxyalkyl methacrylates, ii) hydroxy group-containing acrylic monomers such as ethylene oxide adducts or propylene oxide adducts, and iii) hydroxy group-containing acrylic monomers with 7 or more carbons are not desirable because the crosslinking density of the paint film decreases and the acid resistance decreases, since the hydroxy groups are separated from the main chain.

Consequently, it is preferable if the content of the aforesaid undesired other monomers i), ii) and iii) is low, and for example, relative to 100 parts by mass of acrylic resin (A), the content (total) of monomers i), ii) and iii) is preferably less than 5 parts by mass, more preferably less than 1 part by mass, and especially preferably these monomers are essentially not contained.

It should be noted that, in the present invention, content relative to 100 parts by mass of acrylic resin (A) when the total mass of the starting monomers of acrylic resin (A) is taken to be 100 parts by mass (excluding solvent and catalyst), means the quantity (parts by mass) of each monomer used. Further, acrylic resin (A) is a general concept which includes both acrylic resins and methacrylic resins, in other words, it is a resin which contains at least one acrylic monomer or methacrylic monomer, or both, as monomer units.

The content of hydroxy group-containing acrylic monomer in acrylic resin (A), relative to 100 parts by mass of acrylic resin (A), is preferably 30-40 parts by mass as 2-hydroxyethyl methacrylate, more preferably 33-37 parts by mass. With less than 30 parts by mass of 2-hydroxyethyl methacrylate, adequate cross-linking is not obtained, and the acid resistance and scratch resistance decrease. Further, if it is greater than 40 parts by mass, the polarity of the acrylic resin obtained after polymerization becomes too high, the compatibility with melamine resin and other components decreases, and the paint film appearance declines.

In the acrylic resins (A) of the present invention, other ethylenically unsaturated monomers copolymerizable with the aforesaid hydroxy group-containing acrylic monomer can also be used. As other ethylenically unsaturated monomers, acrylic acid or methacrylic acid; hydrocarbon group esters of acrylic acid or methacrylic acid (hydrocarbon groups are for example methyl, ethyl, n-propyl, isopropyl, n-butyl, isobutyl, t-butyl, hexyl, cyclohexyl, 2-ethylhexyl, lauryl, stearyl and the like); and other monomers such as acrylonitrile, methacrylonitrile, acrylamide and methacrylamide are mentioned.

As copolymerizable ethylenically unsaturated monomers other than the aforesaid, styrene, α-methylstyrene, maleic acid, vinyl acetate and the like are mentioned.

In terms of paint film appearance, other ethylenically unsaturated monomers copolymerizable with these hydroxy group-containing acrylic monomers preferably include styrene, and, in terms of designability and scratch resistance, preferably include 2-ethylhexyl acrylate.

The content of styrene in acrylic resin (A), relative to 100 parts by mass of acrylic resin (A), is preferably 10-30 parts by mass, more preferably 15-25 parts by mass. If the styrene content is less than 10 parts by mass, the refractive index of the acrylic resin (A) decreases, and the paint film gloss decreases. Further, if it is greater than 30 parts by mass, the weather resistance decreases.

The content of 2-ethylhexyl acrylate in acrylic resin (A), relative to 100 parts by mass of acrylic resin (A), is preferably 25 parts by mass or more. More preferably, it is 35 parts by mass or more. Although there is no particular upper limit as to the content of 2-ethylhexyl acrylate, the content thereof is preferably 60 parts by mass or less, more preferably less than 50 parts by mass.

If the content of 2-ethylhexyl acrylate is less than 25 parts by mass, the scratch resistance decreases. Furthermore, if glitter material components such as aluminum pigment are contained in the colored basecoat paint composition, orientation of the glitter material components is decreased, and the designability and/or scratch resistance is decreased.

The acrylic resins (A) of the present invention can be obtained by known methods such as the method of solution radical polymerization of ethylenically unsaturated monomers such as acrylic monomers, and their mass average molecular mass (weight average molecular weight) is preferably 5,000-12,000. More preferably, it is 7,000-10,000. If the mass average molecular mass is less than 5,000, if glitter material components such as aluminum pigment are contained in the colored basecoat paint composition, orientation of the glitter material components is decreased, and the designability is decreased. Further, if it is greater than 12,000, compatibility with melamine resins, and other components, decreases and the paint film appearance declines.

It should be noted that the mass average molecular masses in the present invention are values obtained by gel permeation chromatography (GPC) using polystyrene as the reference substance.

The glass transition temperature of the acrylic resin (A) of the present invention is preferably −25 to −5° C. More preferably, it is −20 to −10° C. If it is lower than −25° C., sufficient paint film hardness may not be obtained. Further, if it is higher than −5° C., the scratch resistance decreases. It should be noted that the glass transition temperatures in the present specification are actual measured values wherein the low temperature side change point by differential scanning calorimetry analysis is taken as the glass transition temperature.

The content of the acrylic resin (A) in the topcoat paint composition of the present invention, relative to 100 parts by mass total resin solids in the topcoat paint composition, is preferably 45 parts by mass or more. More preferably, it is 55 parts by mass or more. With less than 45 parts by mass, a decrease in scratch resistance, a decrease in acid rain resistance and/or, if glitter material components such as aluminum pigment are contained in the colored basecoat paint composition, a decrease in orientation of the glitter material components and decrease in designability occur.

As crosslinking agents reacting with the hydroxy groups of the acrylic resin (A) of the present invention, melamine resins, polyisocyanates, blocked polyisocyanates and the like are mentioned, but in terms of having few limitations to service life and storage temperature conditions in the handling of the one-pack type, melamine resins are preferable.

As the melamine resin, for example partly or completely methylolated melamine resins obtained by reacting melamine and formaldehyde; partial or complete alkyl ether type melamine resins obtained by partial or complete etherification of the methylol groups of a methylolated melamine resin with an alcohol component; imino group-containing melamine resins; and mixed type melamine resins from mixing of more than one of these are mentioned.

Furthermore, as alkyl ether type melamine resins, for example methylated melamine resins, butylated melamine resins, methyl/butyl mixed alkyl type melamine resins and the like are mentioned. These melamine resins can be used alone, or can be used after combination of 2 or more types. However, in terms of designability and paint film appearance, melamine resins not containing complete alkyl ether type melamine resins are preferable.

The melamine resin (B) preferably contains a melamine resin (B1) which has a specific mass average molecular mass and is not completely alkyl ether type. The mass average molecular mass of the aforesaid melamine resin (B1) is preferably 1,000 to 3,000. More preferably, it is 1,200 to 2,800. With a melamine resin (B1) of mass average molecular mass less than 1,000, if glitter material components such as aluminum pigment are incorporated in the colored basecoat paint composition, the orientation of the glitter material components may decrease and the designability may decrease. Further, if it is greater than 3,000, the compatibility with acrylic resin (A) and other components may decrease, and the paint film appearance may decline.

The content of the aforesaid melamine resin (B1) in the melamine resin (B), relative to 100 parts by mass of total melamine resin (B), is preferably 50 parts by mass or more. More preferably, it is 60 parts by mass or more. With a melamine resin (B1) content of less than 50 parts by mass, if glitter material components such as aluminum pigment are incorporated in the colored basecoat paint composition, the orientation of the glitter material components may decrease and the designability may decrease. Further, the compatibility with acrylic resin (A) and other components may decrease, and the paint film appearance may decline.

The content of melamine resin (B) in the topcoat paint composition of the present invention, as the ratio to acrylic resin (A), is preferably acrylic resin (A)/melamine resin (B)=50/50 to 80/20. More preferably, it is 60/40 to 75/25. If the percentage of melamine resin (B) is greater than 50/50, the acid rain resistance and scratch resistance decrease. Further, if it is less than 80/20, sufficient paint film hardness is not obtained.

The topcoat paint composition of the present invention can further contain a blocked isocyanate resin (C). In the blocked isocyanate resin, the isocyanate groups of the isocyanate compound are protected by a blocking agent.

As isocyanate compounds, for example, one or more compounds selected from aliphatic diisocyanates such as hexamethylene diisocyanate, trimethylhexamethylene diisocyanate and dimer acid diisocyanate; cyclic aliphatic diisocyanates such as isophorone diisocyanate, xylylene diisocyanate (XDI), metaxylylene diisocyanate and hydrogenated XDI, aromatic diisocyanates such as tolylene diisocyanate (TDI), 4,4-diphenylmethane diisocyanate (MDI), hydrogenated TDI and hydrogenated MDI; furthermore, adducts, biurets and isocyanurates of these isocyanates can be used.

As blocking agents, for example one or more compounds selected from alcohols such as butanol; oximes such as methyl ethyl ketoxime; lactams such as ε-caprolactam; keto esters such as acetoacetate esters; imidazoles such as imidazole and 2-ethylimidazole or phenols such as m-cresol can be used.

Among the aforesaid, in terms of curing temperature, service life and storage temperature condition limits, as the blocked isocyanate resin (C), isocyanurates of hexamethylene diisocyanate wherein the isocyanate groups are protected with a pyrazole such as 3-methyl-pyrazole or dimethylpyrazole are preferable.

The content of the blocked isocyanate resin (C) in the topcoat paint composition, per 100 parts by mass of topcoat paint composition total resin solids is preferably 15 parts by mass or less. If it is greater than 15 parts by mass, sufficient paint film hardness may not be obtained.

In the topcoat paint compositions of the present invention, together with the aforesaid acrylic resin (A), melamine resin (B) and optionally the blocked isocyanate resin (C), one or more of various resins, various additives such as surface modifiers, defoamers, surfactants, film-forming agents, preservatives, UV absorbers, light stabilizers, antioxidants and acid catalysts, various rheology control agents, various organic solvents and the like commonly used in topcoat paint compositions can be incorporated.

As necessary, the topcoat paint composition can be supplied for painting after dilution to a suitable viscosity with an organic solvent. Normally it is ideal to use a diluted paint diluted to a viscosity of 20-35 secs (Ford cup No. 4/20° C.).

There is no particular restriction as to the solids content of the diluted paint during painting, but for example it is 40-50 mass %.

There is no particular restriction as to the painting method for the topcoat paint composition, and previously known methods can be selected and used as appropriate. As preferable painting methods, electro-static painting (bell type, REA method, etc.), air spray painting and the like are mentioned.

There is no particular restriction as to the temperature and humidity conditions during application of the topcoat paint composition, and for example the temperature is 10-60° C. and the humidity 50-95% (relative humidity). The topcoat paint composition paint film thickness, as cured paint film, is preferably 20-80 μm, in particular 25-50 μm. Further, the preferable thermal curing temperature and time in the thermal curing process are for example 120-170° C. and 10-60 mins.

There is no particular restriction as to the multilayer paint film formation method using the topcoat paint compositions, and for example excellent appearance, water resistance and weather resistance can be obtained by using them as the topcoat paint composition in a multilayer paint film formation process comprising a colored basecoat formation process wherein a colored basecoat paint film is formed by applying a colored basecoat paint composition onto the item to be painted, a topcoat paint film formation process wherein a topcoat paint film is formed by applying the topcoat paint composition wet-on-wet onto the uncured aforesaid colored basecoat paint film, and a thermal curing process wherein these two paint film layers are simultaneously thermally cured.

In multilayer paint film forming methods using the topcoat paint compositions, as the item to be painted, for example those with an electrocoated paint film on metal, those with a midcoat paint film on top of an electrocoated paint film, plastic and the like are mentioned. Even if this topcoat paint composition is applied onto a layer (e.g. basecoat layer) containing a glitter material component such as Al pigment, the designability is not impaired.

PRACTICAL EXAMPLES

Below, the present invention is illustrated in more detail by presentation of practical examples, but the present invention is not limited to these. It should be noted that, unless otherwise stated, parts, % and ratios in each example respectively mean parts by mass, mass % and mass ratios.

Production of Acrylic Resin AC-1

40.0 parts of Solvesso 100 (brand name, Exxon Chemical Corp., aromatic naphtha solvent) and 26.6 parts of butyl acetate were placed in a 4-necked flask fitted with thermometer, reflux condenser, stirrer and dropping funnel, heated with stirring under a current of nitrogen and maintained at 140° C.

Next, at the temperature of 140° C., radical polymerizable monomers consisting of 35.0 parts of 2-hydroxyethyl methacrylate, 20.0 parts of styrene, 43.0 parts of 2-ethylhexyl acrylate and 2.0 parts of acrylic acid radical polymerizable monomers, and 2.0 parts of t-butyl peroxybenzoate as polymerization initiator were homogenously mixed, and added dropwise at constant speed over 3 hours from the dropping funnel. After the end of the dropwise addition, the reaction was completed by maintaining the temperature at 140° C. for 1.5 hours. The acrylic resin AC-1 of mass average molecular mass 8,600 was obtained.

Production of Acrylic Resins AC-2 to AC-21

The acrylic resins AC-2 to AC-21 were obtained similarly to the production method for acrylic resin AC-1, except that the radical polymerizable monomer incorporation ratios were changed to the values stated in table 1a-table 1b.

TABLE 1a

| | | acrylic resin No. | | | | | | | | | | |
|---|---|---|---|---|---|---|---|---|---|---|---|---|
| | | AC1 | AC2 | AC3 | AC4 | AC5 | AC6 | AC7 | AC8 | AC9 | AC10 | AC11 |
| | Solvesso 100 | 40 | 40 | 40 | 40 | 40 | 40 | 40 | 40 | 40 | 40 | 40 |
| | butyl acetate | 26.6 | 26.6 | 26.6 | 26.6 | 26.6 | 26.6 | 26.6 | 26.6 | 26.6 | 26.6 | 26.6 |
| radical polymerizable monomers | 2-hydroxy-ethyl methacrylate | 35 | 31 | 33 | 31 | 39 | 35 | 35 | 31 | 29 | 31 | 42 |
| | styrene | 20 | 11 | 16 | 29 | 20 | 20 | 20 | 20 | 8 | 32 | 20 |
| | 2-ethylhexyl acrylate | 43 | 26 | 36 | 38 | 39 | 43 | 43 | 47 | 23 | 35 | 36 |
| | methyl methacrylate | | | 2 | | | | | | | | |
| | 2-ethylhexyl methacrylate | | 15 | 4 | | | | | | 15 | | |
| | BLEMMER SLMA-S (C15-16 methacrylates) | | | | | | | | | | | |
| | 2-hydroxyethyl acrylate | | | | | | | | | | | |
| | butyl acrylate | | 15 | 7 | | | | | | 23 | | |
| | acrylic acid | 2 | 2 | 2 | 2 | 2 | 2 | 2 | 2 | 2 | 2 | 2 |
| | 4-hydroxybutyl acrylate ε-caprolactone | | | | | | | | | | | |
| | total | 100 | 100 | 100 | 100 | 100 | 100 | 100 | 100 | 100 | 100 | 100 |
| | t-butyl peroxybenzoate | 2 | 2 | 2 | 2 | 2 | 4.5 | 1.8 | 2 | 2 | 2 | 2 |
| | Total | 168.6 | 168.6 | 168.6 | 168.6 | 168.6 | 171.1 | 168.4 | 168.6 | 168.6 | 168.6 | 168.6 |
| | resin solids content | 60% | 60% | 60% | 60% | 60% | 61% | 60% | 60% | 60% | 60% | 60% |
| | glass transition temperature | −16 | −15 | −13 | −6 | −10 | −19 | −15 | −23 | −20 | −1 | −5 |
| | mass average molecular mass | 8600 | 8100 | 8400 | 7800 | 8900 | 5600 | 11700 | 7700 | 8800 | 8200 | 8500 |

TABLE 1b

| | | acrylic resin No. | | | | | | | | | |
|---|---|---|---|---|---|---|---|---|---|---|---|
| | | AC12 | AC13 | AC14 | AC15 | AC16 | AC17 | AC18 | AC19 | AC20 | AC21 |
| | Solvesso 100 | 40 | 40 | 40 | 40 | 40 | 40 | 40 | 40 | 40 | 40 |
| | butyl acetate | 26.6 | 26.6 | 26.6 | 26.6 | 26.6 | 26.6 | 26.6 | 26.6 | 26.6 | 26.6 |
| radical polymerizable monomers | 2-hydroxy-ethyl methacrylate | 35 | 35 | 31 | | | 35 | 35 | 35 | 35 | 35 |
| | styrene | 20 | 20 | 17 | | 12 | | 20 | 20 | 20 | 20 |
| | 2-ethylhexyl acrylate | 43 | 43 | 50 | | | 43 | | | 33 | 33 |
| | methyl methacrylate | | | | | | 20 | | | | |
| | 2-ethylhexyl methacrylate | | | | 50 | 51 | | 43 | | | |
| | BLEMMER SLMA-S (C15-16 methacrylates) | | | | | | | | 43 | | |
| | 2-hydroxyethyl acrylate | | | | 35 | 35 | | | | | |
| | butyl acrylate | | | | 13 | | | | | | |
| | acrylic acid | 2 | 2 | 2 | 2 | 2 | 2 | 2 | 2 | 2 | 2 |
| | 4-hydroxybutyl acrylate | | | | | | | | | 10 | |
| | ε-caprolactone | | | | | | | | | | 10 |
| | total | 100 | 100 | 100 | 100 | 100 | 100 | 100 | 100 | 100 | 100 |
| | t-butyl peroxybenzoate | 6 | 1.5 | 2 | 2 | 2 | 2 | 2 | 2 | 2 | 2 |
| | Total | 172.6 | 168.1 | 168.6 | 168.6 | 168.6 | 168.6 | 168.6 | 168.6 | 168.6 | 168.6 |
| | resin solids content | 61% | 60% | 60% | 60% | 60% | 60% | 60% | 60% | 60% | 60% |
| | glass transition temperature | −21 | −15 | −27 | −13 | 3 | −14 | 2 | −3 | −23 | −21 |
| | mass average molecular mass | 4700 | 12800 | 7900 | 8800 | 8600 | 8500 | 7700 | 8200 | 7600 | 8300 |

Practical Example 1: Production and Assessment of Topcoat Paint Composition CC-1

Production of Topcoat Paint Composition CC-1

108 parts by mass of acrylic resin AC-1, 58 parts by mass of melamine resin (brand name "MELAN2300", Hitachi Chemical Co., Ltd., n-butylated melamine resin), 1.0 part by mass of UV absorber (brand name "Tinuvin 400", BASF SE, hydroxyphenyltriazine type UV absorber), 1.0 part by mass of light stabilizer (brand name "Tinuvin 292", BASF SE, hindered amine light stabilizer) and 0.5 parts by mass of surface modifier (brand name "BYK-325", Byk Chemie GmbH, silicone type surface modifier) were mixed in a stainless steel vessel with stirring until homogeneous, and the topcoat paint composition CC-1 was obtained.

Topcoat Paint Composition CC-1 Paint Film Performance Assessment

Test pieces for topcoat paint composition CC-1 paint film performance assessment were made by the following test piece preparation methods, paint film performance assessments relating to the headings (1) to (6) were performed and the results were summarized in table 2.

Test Piece Preparation Method for Designability Assessment

The cationic electrocoating paint Cathoguard 500 (brand name, BASF Coatings GmbH) was electrocoated onto a zinc phosphate-treated mild steel plate so as to give a dry film thickness of 20 μm, and stoved for 25 mins. at 175° C., further, the midcoat paint Hi-epico No. 565 dark grey (brand name, BASF Japan Co., Ltd.) was air sprayed on so as to give a dry film thickness of 30 μm, and stoved for 30 mins. at 140° C. Next, Belcoat No. 7000 silver-metallic (brand name, BASF Japan Co., Ltd.), which is a solvent-type colored basecoat paint, was air sprayed on so as to give a dry film thickness of 15 μm, and after setting for 3 mins. at 20° C., the clear paint obtained in the aforesaid practical example, diluted to paint viscosity (Ford cup No. 4, 25 secs at 20° C.) with Solvesso 100, was air sprayed on by a wet-on-wet system so as to obtain dry film thicknesses each of 40 μm, and stoved for 30 mins. at 140° C. to give the test pieces.

Test Piece Preparation Method for Assessment of Performance Other than Designability The cationic electrocoating paint Cathoguard 500 (brand name, BASF Coatings GmbH) was electrocoated onto a zinc phosphate-treated mild steel plate so as to give a dry film thickness of 20 μm, stoved for 25 mins. at 175° C., further, the midcoat paint Hi-epico No. 565 dark grey (brand name, BASF Japan Co., Ltd.) was air sprayed on so as to give a dry film thickness of 30 μm, and stoved for 30 mins. at 140° C. Next, Belcoat No. 7000 black solid (brand name, BASF Japan Co., Ltd.), which is a solvent-type colored basecoat paint, was air sprayed on so as to give a dry film thickness of 15 μm, and after setting for 3 mins. at 20° C., the clear paint obtained in the aforesaid practical example, diluted to paint viscosity (Ford cup No. 4, 25 secs at 20° C.) with Solvesso 100, was air sprayed on by a wet-on-wet system so as to obtain dry film thicknesses each of 40 μm, and stoned for 30 mins. at 140° C. to give the test pieces.

(1) Acid Rain Resistance

After degreasing the test pieces with isopropyl alcohol, they were spotted with 2 ml of pH3 aqueous sulfuric acid solution, dried for 90 mins. at 70° C., then degraded paint film was removed with a paint film surface finishing polish and the corrosion depth of the outlined part was measured with a surface roughness tester, and the results were assessed by the following criteria.

⊚: 1 μm or less
○: 1-1.5 μm
Δ: 1.5-2 μm
X: greater than 2 μm.

(2) Scratch Resistance

As regards car wash damage resistance, muddy water (JIS Z-8901-848 type dust/water/neutral detergent=10/99/1 mass ratio mixture) was applied onto the test plate with a brush, then the car wash brushes in a car wash machine were rotated at 150 rpm for 10 secs, and the test plate was washed with running water. After twice repeating the above operations, the degree of test piece surface scratching, the L* value, was measured with a color difference meter (CR-331, Minolta Camera Co., Ltd.). The ΔL* value was calculated by the following formula, and those values were assessed by the following criteria.

ΔL* value=L* value after test−L* value before test
○: ΔL* value less than 20
Δ: ΔL* value more than 20, less than 30
X: ΔL* value 30 or more.
(3) Gloss
The values measured with a 20° glossmeter were assessed by the following criteria:
◉: 87 or more
○: 85 or more, less than 87
Δ: 83 or more, less than 85
X: less than 83.
(4) Designability
The assessment was made by the following criteria, using retention ratio of the flip-flop value for each test piece, relative to the flip-flop value of the test piece on which colored basecoat only was applied and dried at 140° C.
◉: 95% or more
○: 90% or more, less than 95%
Δ: 85% or more, less than 90%
X: less than 85%.
(5) Paint Film Appearance
A wave scan (ByYKGardner GmbH) was used, and the assessment was made by the following criteria, using the DOI Sw values:

◉: 10 or less
○: greater than 10
Δ: greater than 15
X: greater than 20.
(6) Paint Film Hardness
Paint film hardness was measured in accordance with the JIS K5600-5-4 (1999) scratch hardness (lead pencil method) test method, and assessed by the following criteria:
◉: H or more
○: F
Δ: HB
X: B or less.

Practical Examples 2-16 and Comparison Examples 1-16: Production and Assessment of Topcoat Paint Compositions CC-2 to CC-32

The topcoat paint compositions CC-2 to CC-32 were produced by the same method as Practical Example 1 on the basis of the compounding compositions stated in Table 2 to Table 3, the performance of each paint film was assessed, and the results are summarized in Tables 2-3 below.

TABLE 2

| | | 1. practical example No. | | | | | | | |
|---|---|---|---|---|---|---|---|---|---|
| | | 1 | 2 | 3 | 4 | 5 | 6 | 7 | 8 |
| 2. acrylic resin (A) | resin No. | AC1 | AC2 | AC3 | AC4 | AC5 | AC6 | AC7 | AC8 |
| | quantity incorporated | 108 | 108 | 108 | 108 | 108 | 107 | 108 | 108 |
| 3. melamine resin (B) | MELAN2300 (B1) (note1) | 58 | 58 | 58 | 58 | 58 | 58 | 58 | 58 |
| | MYCOAT508 (B1) (note2) | | | | | | | | |
| | MELAN27 (note3) | | | | | | | | |
| | CYMEL327 (note4) | | | | | | | | |
| | CYMEL303 (note5) | | | | | | | | |
| 4. blocked isocyanate resin (note6) | | | | | | | | | |
| 5. UV absorber (note7) | | 1.0 | 1.0 | 1.0 | 1.0 | 1.0 | 1.0 | 1.0 | 1.0 |
| 6. light stabilizer (note8) | | 1.0 | 1.0 | 1.0 | 1.0 | 1.0 | 1.0 | 1.0 | 1.0 |
| 7. surface modifier (note9) | | 0.5 | 0.5 | 0.5 | 0.5 | 0.5 | 0.5 | 0.5 | 0.5 |
| 8. total | | 168.5 | 168.5 | 168.5 | 168.5 | 168.5 | 167.5 | 168.5 | 168.5 |
| 9. acryl resin/melamine resin | | 65/35 | 65/35 | 65/35 | 65/35 | 65/35 | 65/35 | 65/35 | 65/35 |
| 10. percentage melamine resin (B1) in total melamine resin (B) | | 100 | 100 | 100 | 100 | 100 | 100 | 100 | 100 |
| 11. quantity of blocked isocyanate resin | | | | | | | | | |
| 12. acrylic resin main monomers | 2-HEA | 35 | 31 | 33 | 31 | 39 | 35 | 35 | 31 |
| | styrene | 20 | 11 | 16 | 29 | 20 | 20 | 20 | 20 |
| | 2-EHA | 43 | 26 | 36 | 38 | 39 | 43 | 43 | 47 |
| | 4-HBA | | | | | | | | |
| | ε-caproctone | | | | | | | | |
| 13. acrylic resin properties | glass transition temperature | −16 | −15 | −13 | −6 | −10 | −19 | −15 | −23 |
| | aass average molecular mass | 8600 | 8100 | 8400 | 7800 | 8900 | 5600 | 11700 | 7700 |
| 14. paint film performance | acid rain resistance | ◉ | ○ | ◉ | ○ | ◉ | ◉ | ◉ | ○ |
| | scratch resistance | ◉ | ○ | ◉ | ○ | ◉ | ◉ | ◉ | ○ |
| | gloss | ◉ | ○ | ◉ | ○ | ◉ | ◉ | ◉ | ◉ |
| | designability | ◉ | ○ | ◉ | ◉ | ◉ | Δ | ◉ | ◉ |
| | paint film appearance | ◉ | ◉ | ◉ | ◉ | ○ | ◉ | Δ | ◉ |
| | paint film hardness | ○ | ○ | ○ | ◉ | ○ | ○ | ○ | Δ |

| | | 1. practical example No. | | | | | | | |
|---|---|---|---|---|---|---|---|---|---|
| | | 9 | 10 | 11 | 12 | 13 | 14 | 15 | 16 |
| 2. acrylic resin (A) | resin No. | AC1 | AC1 | AC1 | AC1 | AC1 | AC1 | AC1 | AC1 |
| | quantity incorporated | 87 | 130 | 108 | 108 | 125 | 125 | 75 | 108 |
| 3. melamine resin (B) | MELAN2300 (B1) (note1) | 58 | 37 | 29 | | | | 75 | 50 |
| | MYCOAT508 (B1) (note2) | | | | 22 | | | | |
| | MELAN27 (note3) | | | 31 | | 44 | | | |
| | CYMEL327 (note4) | | | | 19 | | 28 | | |
| | CYMEL303 (note5) | | | | | | | | |

TABLE 2-continued

| | | | | | | | | | |
|---|---|---|---|---|---|---|---|---|---|
| 4. blocked isocyanate resin (note6) | | | | | | | | 13 | 20 |
| 5. UV absorber (note7) | | 1.0 | 1.0 | 1.0 | 1.0 | 1.0 | 1.0 | 1.0 | 1.0 |
| 6. light stabilizer (note8) | | 1.0 | 1.0 | 1.0 | 1.0 | 1.0 | 1.0 | 1.0 | 1.0 |
| 7. surface modifier (note9) | | 0.5 | 0.5 | 0.5 | 0.5 | 0.5 | 0.5 | 0.5 | 0.5 |
| 8. total | | 147.5 | 169.5 | 170.5 | 151.5 | 171.5 | 155.5 | 165.5 | 180.5 |
| 9. acryl resin/melamine resin | | 52/48 | 78/22 | 65/35 | 65/35 | 75/25 | 75/25 | 50/50 | 69/31 |
| 10. percentage melamine resin (B1) in total melamine resin (B) | | 100 | 100 | 50 | 50 | 0 | 0 | 100 | 100 |
| 11. quantity of blocked isocyanate resin | | | | | | | | 10 | 15 |
| 12. acrylic resin main monomers | 2-HEA | 35 | 35 | 35 | 35 | 35 | 35 | 35 | 35 |
| | styrene | 20 | 20 | 20 | 20 | 20 | 20 | 20 | 20 |
| | 2-EHA | 43 | 43 | 43 | 43 | 43 | 43 | 43 | 43 |
| | 4-HBA | | | | | | | | |
| | ε-caproctone | | | | | | | | |
| 13. acrylic resin properties | glass transition temperature | −16 | −16 | −16 | −16 | −16 | −16 | −16 | −16 |
| | aass average molecular mass | 8600 | 8600 | 8600 | 8600 | 8600 | 8600 | 8600 | 8600 |
| 14. paint film performance | acid rain resistance | Δ | ◎ | ◎ | ◎ | ◎ | ◎ | ○ | ◎ |
| | scratch resistance | ○ | ○ | ◎ | ◎ | ◎ | ◎ | ◎ | ◎ |
| | gloss | ◎ | ○ | ○ | ○ | Δ | ◎ | ○ | ○ |
| | designability | ○ | ◎ | ◎ | ○ | ◎ | Δ | ○ | ○ |
| | paint film appearance | ○ | ◎ | ◎ | ◎ | ◎ | ◎ | ○ | ○ |
| | paint film hardness | ○ | Δ | ○ | ○ | ◎ | ◎ | ○ | Δ |

2-HEA: 2-hydroxyethyl methacrylate;
2-EHA: 2-ethylhexyl acrylate;
4-HBA: 4-hydroxybutyl acrylate.

TABLE 3

| | | 1. comparison example No. | | | | | | | |
|---|---|---|---|---|---|---|---|---|---|
| | | 1 | 2 | 3 | 4 | 5 | 6 | 7 | 8 |
| 2. acrylic resin (A) | resin No. | AC9 | AC10 | AC11 | AC12 | AC13 | AC14 | AC15 | AC16 |
| | quantinty incorporated | 108 | 108 | 108 | 107 | 108 | 108 | 108 | 108 |
| 3. melamine resin (B) | MELAN2300 (B1) (note1) | 58 | 58 | 58 | 58 | 58 | 58 | 58 | 58 |
| | MYCOAT508 (B1) (note2) | | | | | | | | |
| | MELAN27 (note3) | | | | | | | | |
| | CYMEL327 (note4) | | | | | | | | |
| | CYMEL303 (note5) | | | | | | | | |
| 4. blocked isocyanate resin (note6) | | | | | | | | | |
| 5. UV absorber (note7) | | 1.0 | 1.0 | 1.0 | 1.0 | 1.0 | 1.0 | 1.0 | 1.0 |
| 6. light stabilizer (note8) | | 1.0 | 1.0 | 1.0 | 1.0 | 1.0 | 1.0 | 1.0 | 1.0 |
| 7. surface modifier (note9) | | 0.5 | 0.5 | 0.5 | 0.5 | 0.5 | 0.5 | 0.5 | 0.5 |
| 8. total | | 168.5 | 168.5 | 168.5 | 167.5 | 168.5 | 168.5 | 168.5 | 168.5 |
| 9. acryl resin/melamine resin | | 65/35 | 65/35 | 65/35 | 65/35 | 65/35 | 65/35 | 65/35 | 65/35 |
| 10. percentage melamine resin (B1) in total melamine resin (B) | | 100 | 100 | 100 | 100 | 100 | 100 | 100 | 100 |
| 11. quantity of blocked isocyanate resin | | | | | | | | | |
| 12. acrylic resin main monomers | 2-HEA | 29 | 31 | 42 | 35 | 35 | 31 | | |
| | styrene | 8 | 32 | 20 | 20 | 20 | 17 | | 12 |
| | 2-EHA | 23 | 35 | 36 | 43 | 43 | 50 | | |
| | 4-HBA | | | | | | | | |
| | ε-caproctone | | | | | | | | |
| 13. acrylic resin properties | glass transition temperature | −20 | −1 | −5 | −21 | −15 | −27 | −13 | 3 |
| | aass average molecular mass | 8800 | 8200 | 8500 | 4700 | 12800 | 7900 | 8800 | 8600 |
| 14. paint film performance | acid rain resistance | X | X | ◎ | ○ | ◎ | ○ | X | X |
| | scratch resistance | X | X | ◎ | ○ | ◎ | ◎ | X | X |
| | gloss | X | ◎ | ◎ | ◎ | ◎ | ◎ | X | ◎ |
| | designability | X | ◎ | ○ | X | ◎ | ○ | ○ | ○ |
| | paint film appearance | ○ | ◎ | X | ◎ | X | ◎ | ○ | ○ |
| | paint film hardness | ○ | ◎ | ◎ | Δ | Δ | X | Δ | ◎ |

| | | 1. comparison example No. | | | | | | | |
|---|---|---|---|---|---|---|---|---|---|
| | | 9 | 10 | 11 | 12 | 13 | 14 | 15 | 16 |
| 2. acrylic resin (A) | resin No. | AC17 | AC18 | AC19 | AC20 | AC21 | AC1 | AC1 | AC1 |
| | quantity incorporated | 108 | 108 | 108 | 108 | 108 | 67 | 142 | 125 |
| 3. melamine resin (B) | MELAN2300 (B1) (note1) | 58 | 58 | 58 | 58 | 58 | 100 | 25 | |
| | MYCOAT508 (B1) (note2) | | | | | | | | |

TABLE 3-continued

| | | | | | | | | | |
|---|---|---|---|---|---|---|---|---|---|
| | MELAN27 (note3) | | | | | | | | |
| | CYMEL327 (note4) | | | | | | | | |
| | CYMEL303 (note5) | | | | | | | | 26 |
| 4. blocked isocyanate resin (note6) | | | | | | | | | |
| 5. UV absorber (note7) | | 1.0 | 1.0 | 1.0 | 1.0 | 1.0 | 1.0 | 1.0 | 1.0 |
| 6. light stabilizer (note8) | | 1.0 | 1.0 | 1.0 | 1.0 | 1.0 | 1.0 | 1.0 | 1.0 |
| 7. surface modifier (note9) | | 0.5 | 0.5 | 0.5 | 0.5 | 0.5 | 0.5 | 0.5 | 0.5 |
| | 8. total | 168.5 | 168.5 | 168.5 | 168.5 | 168.5 | 169.5 | 169.5 | 153.5 |
| 9. acryl resin/melamine resin | | 65/35 | 65/35 | 65/35 | 65/35 | 65/35 | 40/60 | 85/15 | 75/25 |
| 10. percentage melamine resin (B1) in total melamine resin (B) | | 100 | 100 | 100 | 100 | 100 | 100 | 100 | 0 |
| 11. quantity of blocked isocyanate resin | | | | | | | | | |
| 12. acrylic resin main monomers | 2-HEA | 35 | 35 | 35 | 35 | 35 | 35 | 35 | 35 |
| | styrene | | 20 | 20 | 20 | 20 | 20 | 20 | 20 |
| | 2-EHA | 43 | | | 33 | 33 | 43 | 43 | 43 |
| | 4-HBA | | | | 10 | | | | |
| | ε-caproctone | | | | | 10 | | | |
| 13. acrylic resin properties | glass transition temperature | −14 | 2 | −3 | −23 | −29 | −16 | −16 | −16 |
| | aass average molecular mass | 8500 | 7700 | 8200 | 7600 | 8300 | 8600 | 8600 | 8600 |
| 14. paint film performance | acid rain resistance | ◯ | ◎ | ◎ | ◯ | X | X | ◎ | ◎ |
| | scratch resistance | ◎ | X | X | ◎ | ◎ | X | Δ | ◎ |
| | gloss | X | ◎ | ◎ | ◎ | ◎ | ◎ | ◎ | ◎ |
| | designability | ◯ | ◎ | ◎ | X | X | X | ◎ | X |
| | paint film appearance | ◯ | ◯ | ◯ | X | Δ | ◯ | ◎ | ◯ |
| | paint film hardness | ◯ | ◎ | ◎ | Δ | X | ◎ | X | ◯ |

Details of each incorporated component shown in tables 2-3 are shown below.

(Note 1) MELAN2300 (brand name, Hitachi Chemical Co., Ltd., n-butyl-etherified melamine resin, solids content 60 mass %, mass average molecular mass 2300, suitable as melamine resin (B1)), (Note 2) MYCOAT508 (brand name, Allnex Japan Inc., n-butyl-etherified melamine resin, solids content 80 mass %, mass average molecular mass 1400, suitable as melamine resin (B1)), (Note 3) MELAN27 (brand name, Hitachi Chemical Co., Ltd., n-butyl-etherified melamine resin, solids content 57 mass %, mass average molecular mass 4600), (Note 4) CYMEL327 (brand name, Allnex Japan Inc., methyl-etherified melamine resin, solids content 90 mass %, mass average molecular mass 500), (Note 5) CYMEL303 (brand name, Allnex Japan Inc., completely methyl-etherified melamine resin, solids content 98 mass %, mass average molecular mass 500), (Note 6) blocked isocyanate resin (brand name "Desmodur BL3575", Covestro Japan Ltd., blocked isocyanate resin, solids content 75 mass %), (Note 7) UV absorber (brand name "Tinuvin 400", BASF SE, hydroxyphenyltriazine type UV absorber), (Note 8) light stabilizer (brand name "Tinuvin 292", BASF SE, hindered amine type light stabilizer), (Note 9) surface modifier (brand name "BYK-325", BYK-Chemie GmbH, silicone type surface modifier).

As is clear from the aforesaid tables 2 and 3, in practical examples 1-16 high scores were obtained in all the assessment tests. On the other hand, comparison examples 1-16 were worse than practical examples 1-16, and especially considering comparison examples 12 and 13, in which the nature of the monomers was changed, and comparison example 16 in which a complete alkyl ether type melamine resin was used, the designability in these comparison examples was markedly worse. Consequently, it is understood that it is necessary to keep the quantity of caprolactone compound and hydroxy group-containing methacrylate with 7 or more carbons in acrylic resin (A) low, and to exclude complete alkyl ether type melamine resins from the melamine resin (B).

The invention claimed is:

1. A topcoat paint composition having an acrylic resin (A) and a melamine resin (B) as the main resins, which can be wet-on-wet applied onto a colored basecoat, wherein:
    said acrylic resin (A), relative to 100 parts by mass of said acrylic resin (A), contains 30-40 parts by mass of 2-hydroxyethyl methacrylate, 10-30 parts by mass of styrene and 25 parts by mass or more of 2-ethylhexyl acrylate,
    said acrylic resin (A) does not contain, relative to 100 parts by mass of said acrylic resin (A), more than 5 parts by mass of other monomer units comprising caprolactone compound(s) and/or hydroxy group-containing (meth)-acrylates constituted of 7 or more carbons,
    said acrylic resin (A) has a mass average molecular mass of 5,000-12,000, and a glass transition temperature of −25 to −5° C.,
    the content of acrylic resin (A), relative to 100 parts by mass of total resin solids of the topcoat paint composition, is 45 or more parts by mass,
    said melamine resin (B) does not contain complete alkyl ether type melamine resin, and
    the content of melamine resin (B), relative to said acrylic resin (A), as resin solids mass ratio, is acrylic resin (A)/melamine resin (B)=50/50 to 80/20.

2. The topcoat paint composition as claimed in claim 1, wherein said melamine resin (B), relative to 100 parts by mass of total melamine resin solids, contains 50 parts by mass or more of a melamine resin (B1) with a mass average molecular mass of 1,000-3,000.

3. The topcoat paint composition as claimed in claim 1, wherein, in 100 parts by mass of topcoat paint composition total resin solids, the topcoat paint composition contains 15 parts by mass or less of a blocked isocyanate resin (C).

4. The topcoat paint composition as claimed in claim 1, wherein said acrylic resin (A) does not contain both a caprolactone compound and a hydroxy group-containing (meth)acrylate containing 7 carbons or more as monomer units.

5. The topcoat paint composition as claimed in claim 2, wherein, in 100 parts by mass of topcoat paint composition total resin solids, the topcoat paint composition contains 15 parts by mass or less of a blocked isocyanate resin (C).

6. The topcoat paint composition as claimed in claim 2, wherein said acrylic resin (A) does not contain both a caprolactone compound and a hydroxy group-containing (meth)acrylate containing 7 carbons or more as monomer units.

7. The topcoat paint composition as claimed in claim 3, wherein said acrylic resin (A) does not contain both a caprolactone compound and a hydroxy group-containing (meth)acrylate containing 7 carbons or more as monomer units.

* * * * *